United States Patent
Tamugi

(10) Patent No.: US 10,974,548 B2
(45) Date of Patent: *Apr. 13, 2021

(54) PNEUMATIC TIRE

(71) Applicant: SUMITOMO RUBBER INDUSTRIES, LTD., Kobe (JP)

(72) Inventor: Akihiro Tamugi, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 252 days.

This patent is subject to a terminal disclaimer.

(21) Appl. No.: 15/793,116

(22) Filed: Oct. 25, 2017

(65) Prior Publication Data

US 2018/0111423 A1    Apr. 26, 2018

(30) Foreign Application Priority Data

Oct. 26, 2016 (JP) .............................. JP2016-209417

(51) Int. Cl.
*B60C 11/00* (2006.01)
*B60C 11/04* (2006.01)
*B60C 11/01* (2006.01)
*B60C 11/13* (2006.01)

(52) U.S. Cl.
CPC ........ *B60C 11/042* (2013.01); *B60C 11/0083* (2013.01); *B60C 11/01* (2013.01); *B60C 11/04* (2013.01); *B60C 11/1376* (2013.01); *B60C 2011/013* (2013.01); *B60C 2200/06* (2013.01)

(58) Field of Classification Search
CPC .. B60C 11/0083; B60C 11/1376; B60C 11/04
See application file for complete search history.

(56) References Cited

U.S. PATENT DOCUMENTS 4,722,378 A * 2/1988 Carolla ............... B60C 11/0302
152/209.15
2018/0111420 A1* 4/2018 Tanida ............... B60C 11/0083

FOREIGN PATENT DOCUMENTS

| JP | 03-153401 A | * | 7/1991 |
| JP | 2006-076359 A | | 3/2006 |
| JP | 2016-055722 A | * | 4/2016 |

OTHER PUBLICATIONS

Machine translation for Japan 03-153401 (Year: 2019).*
Machine translation for Japan 2016-055722 (Year: 2020).*

* cited by examiner

*Primary Examiner* — Steven D Maki
(74) *Attorney, Agent, or Firm* — Birch, Stewart, Kolasch & Birch, LLP

(57) ABSTRACT

In a tire 2, an outer surface 52 of a crown rib 48e and an outer surface 54 of a shoulder rib 48s form a part of a tread surface 28. On a cross-section of the tire 2 along a plane that includes a rotation axis of the tire 2, an outline of the outer surface 52 of the crown rib 48e is represented as a first arc. A center of a circle to which the first arc belongs is disposed on the equator plane. An outline of the outer surface 54 of the shoulder rib 48s is represented as a second arc. A ratio of a distance from a center of a chord of the second arc to the second arc relative to a length of the chord of the second arc is not less than 0.03 and not greater than 0.05.

4 Claims, 2 Drawing Sheets

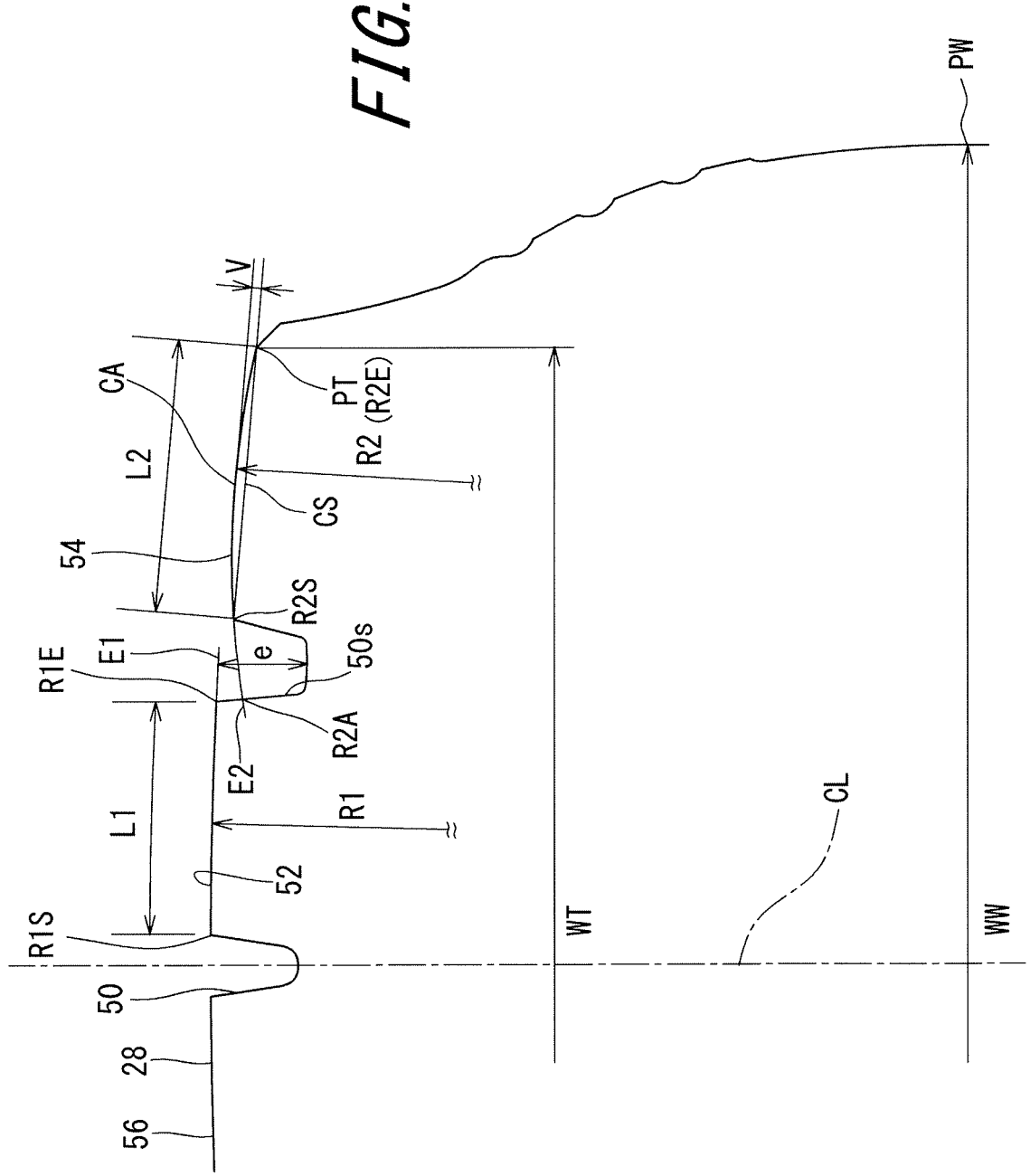

PNEUMATIC TIRE

This application claims priority on Patent Application No. 2016-209417 filed in JAPAN on Oct. 26, 2016. The entire contents of this Japanese Patent Application are hereby incorporated by reference.

BACKGROUND OF THE INVENTION

Field of the Invention

The present invention relates to pneumatic tires. More specifically, the present invention relates to pneumatic tires for small trucks, trucks, buses, and the like.

Description of the Related Art

In a tire in a running state, a tread surface slips relative to a road surface, and the tread becomes worn. In particular, a tire for small trucks, trucks, buses, and the like, that is, a heavy duty tire (including a tire for small trucks), to which a heavy load is applied due to cargo loading or the like, is worn to a great extent.

In general, a tread of a heavy duty tire has a plurality of ribs that extend in the circumferential direction and are aligned in the axial direction. The ribs come into direct contact with a road surface. Therefore, by the shapes of the ribs, the extent of the wear is influenced. In order to improve wear resistance, the shape of the rib has been variously studied. One example of the study is disclosed in JP2006-076359.

A tread surface of a tire has a shape that projects outward entirely. Therefore, among a plurality of ribs provided in the tread, particularly in a rib disposed on the outer side in the axial direction, that is, in a shoulder rib, a circumferential length may be different between the inner side portion of the rib and the outer side portion of the rib.

A contact pressure tends to be higher in a portion having a long circumferential length than in a portion having a short circumferential length. Therefore, in the portion having the long circumferential length, wear is accelerated due to high contact pressure. Meanwhile, the tire is more likely to slip relative to a road surface in the portion having the short circumferential length than in the portion having the long circumferential length. Therefore, in the portion having the short circumferential length, wear is accelerated due to the slipping. Thus, in the shoulder rib, wear is likely to occur due to difference in circumferential length.

Reduction of the extent to which a shoulder rib is worn is attempted by the shape of the outer surface of the shoulder rib being formed into an arc having a relatively large radius and the difference in circumferential length being thus reduced. However, in this attempt, although the extent of the wear can be reduced, the outer surface of the shoulder rib is warped during cornering, and a distribution of contact pressure in the shoulder rib may be changed. Specifically, in the contact surface, of the shoulder rib, which contacts with a road surface, a contact pressure becomes high in the end portion of the contact surface, and a contact pressure becomes low in the center portion of the contact surface. In this case, an area of the portion in which the contact pressure is high is reduced, and cornering power is reduced. Reduction of cornering power causes reduction of steering stability (responsiveness). Therefore, a driver needs to set a steering angle so as to be large by turning a steering wheel sharply for cornering of the vehicle. Further, the large steering angle may cause increase of a region of a portion, of the tire, which slips relative to a road surface. In this case, wear, which is to be reduced in the shoulder rib, may be accelerated.

An object of the present invention is to provide a pneumatic tire that allows steering stability to be improved without reducing wear resistance.

SUMMARY OF THE INVENTION

A pneumatic tire according to the present invention includes a tread having an outer surface that is a tread surface that comes into contact with a road surface. In the tire, the tread includes a plurality of ribs that extend in a circumferential direction, and are aligned in an axial direction. A main groove is formed between one of the ribs and another rib disposed adjacent to the one of the ribs. A rib, among the ribs, disposed at an equator plane of the tire, or near the equator plane, is a crown rib, and a rib, among the ribs, disposed on an outer side in the axial direction is a shoulder rib. An outer surface of the crown rib and an outer surface of the shoulder rib form a part of the tread surface. On a cross-section of the tire along a plane that includes a rotation axis of the tire, an outline of the outer surface of the crown rib is represented as a first arc. A center of a circle to which the first arc belongs is disposed on the equator plane. An outline of the outer surface of the shoulder rib is represented as a second arc. A ratio of a distance from a center of a chord of the second arc to the second arc relative to a length of the chord of the second arc is not less than 0.03 and not greater than 0.05.

In the pneumatic tire according to the present invention, the shape of the outer surface of the shoulder rib is appropriately adjusted by the length of the chord of the second arc that represents the shape of the outer surface, and the distance from the center of the chord of the second arc to the second arc. In the shoulder rib, not only progress of wear due to the difference in circumferential length but also warping of the outer surface during cornering as observed in a conventional tire is inhibited. In the tire, steering stability is advantageously obtained in cornering without reducing wear resistance. According to the present invention, the pneumatic tire that allows steering stability to be improved without reducing wear resistance can be obtained.

Preferably, in the pneumatic tire, the main groove near the shoulder rib is a shoulder main groove. A ratio of the distance from the center of the chord of the second arc to the second arc relative to a depth of the shoulder main groove is not less than 0.09 and not greater than 0.15.

BRIEF DESCRIPTION OF THE DRAWINGS

FIG. 2 is an enlarged view of an outline of a part of the tire shown in FIG. 1.

DESCRIPTION OF THE PREFERRED EMBODIMENTS

Figure 1:
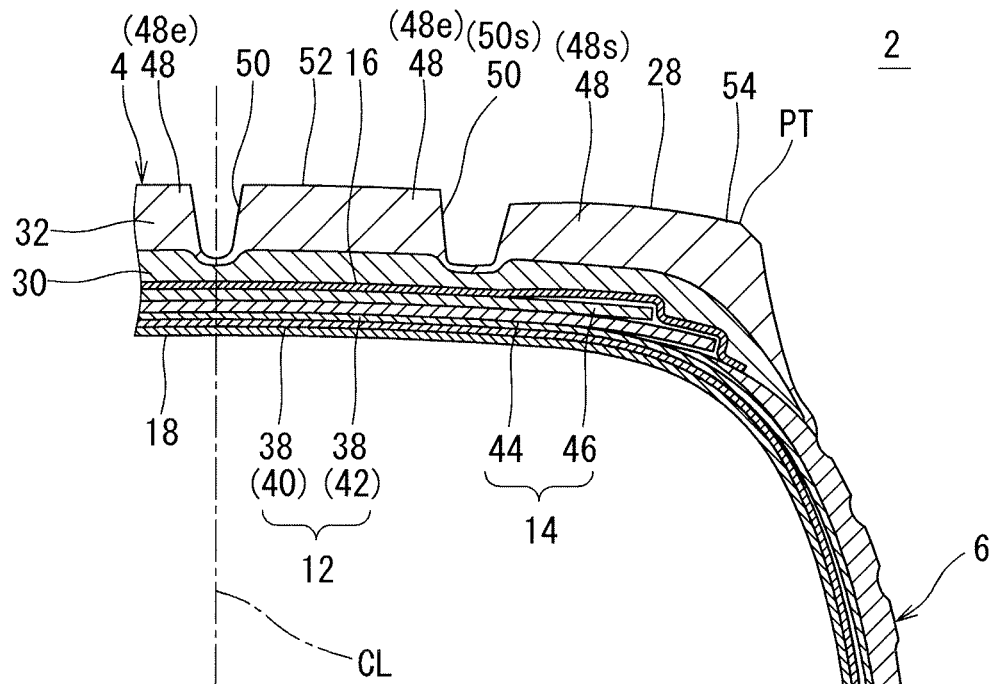
FIG. 1 is a cross-sectional view of a part of a pneumatic tire according to an embodiment of the present invention.

The following will describe in detail the present invention based on preferred embodiments with reference where appropriate to the accompanying drawing.

FIG. 1 shows a part of a cross-section of a pneumatic tire 2. Specifically, FIG. 1 shows a part of the cross-section of the tire 2 along a plane that includes the rotation axis of the tire 2. In FIG. 1, the up-down direction represents the radial direction of the tire 2, the left-right direction represents the axial direction of the tire 2, and the direction perpendicular to the surface of the drawing sheet represents the circumferential direction of the tire 2. In FIG. 1, an alternate long and short dash line CL represents the equator plane of the tire 2. The shape of the tire 2 is symmetric about the equator plane except for a tread pattern.

The tire 2 includes a tread 4, a pair of sidewalls 6, a pair of clinches 8, a pair of beads 10, a carcass 12, a belt 14, a band 16, an inner liner 18, a pair of chafers 20, a pair of bead fillers 22, a pair of first reinforcing fillers 24, and a pair of second reinforcing fillers 26. The tire 2 is of a tubeless type. The tire 2 is mounted to a truck, a bus, or the like. The tire 2 is a heavy duty tire.

The tread 4 has a shape that projects outward in the radial direction. The tread 4 forms a tread surface 28 that comes into contact with a road surface. In other words, the outer surface of the tread 4 is the tread surface 28 that comes into contact with a road surface. In FIG. 1, reference character PT represents the end of the tread surface 28.

In the tire 2, the tread 4 includes a base layer 30 and a cap layer 32. The cap layer 32 is layered over the base layer 30 from the radially outer side of the base layer 30. The outer surface of the cap layer 32 is the tread surface 28 described above. The cap layer 32 is formed from a crosslinked rubber having excellent wear resistance, heat resistance, and grip performance. The base layer 30 is formed from a crosslinked rubber having excellent adhesiveness.

Each sidewall 6 extends almost inward from the end of the tread 4 in the radial direction. The sidewall 6 is formed from a crosslinked rubber having excellent cut resistance and weather resistance. The sidewall 6 prevents damage to the carcass 12.

Each clinch 8 is disposed almost inward of the sidewall 6 in the radial direction. The clinch 8 is disposed outward of the bead 10 and the carcass 12 in the axial direction. The clinch 8 is formed from a crosslinked rubber having excellent wear resistance. The clinch 8 comes into contact with a flange of a rim, which is not shown.

Each bead 10 is disposed inward of the clinch 8 in the axial direction. Each bead 10 includes a core 34 and an apex 36 that extends outward from the core 34 in the radial direction. The core 34 is ring-shaped, and includes a wound non-stretchable wire. A typical material of the wire is steel. The apex 36 is tapered outward in the radial direction. The apex 36 is formed from a highly hard crosslinked rubber.

The carcass 12 includes a carcass ply 38. The carcass 12 of the tire 2 includes two carcass plies 38, that is, a first carcass ply 40 and a second carcass ply 42. The carcass 12 may be formed from one carcass ply 38, or may be formed from three or more carcass plies 38.

In the tire 2, the first carcass ply 40 and the second carcass ply 42 are each extended on and between the beads 10 on both sides, along the tread 4 and the sidewall 6. The first carcass ply 40 is turned up around the core 34 from the inner side toward the outer side in the axial direction. In the tire 2, the end of the first carcass ply 40 is disposed outward of the end of the apex 36 in the radial direction. In the tire 2, the second carcass ply 42 is not turned up. The end of the second carcass ply 42 is disposed near the core 34 of each bead 10 in the radial direction. The second carcass ply 42 is disposed outward of the first carcass ply 40.

Each carcass ply 38 includes multiple cords aligned with each other and topping rubber, which is not shown. An absolute value of an angle of each cord relative to the equator plane is from 75° to 90°. In other words, the carcass 12 forms a radial structure. The cords are formed from an organic fiber.

The belt 14 is disposed inward of the tread 4 in the radial direction. The belt 14 is layered over the carcass 12. The belt 14 reinforces the carcass 12. The belt 14 includes an inner layer 44 and an outer layer 46. Each of the inner layer 44 and the outer layer 46 includes multiple cords aligned with each other and topping rubber, which is not shown. Each cord is tilted relative to the equator plane. An absolute value of the tilt angle is typically not less than 10° and not greater than 35°. A direction in which the cords of the inner layer 44 are tilted relative to the equator plane is opposite to a direction in which the cords of the outer layer 46 are tilted relative to the equator plane. A material of the cords is steel. The width, in the axial direction, of the belt 14 is preferably not less than 0.6 times the maximum width of the tire 2. The belt 14 may include three or more layers.

The band 16 is disposed outward of the belt 14 in the radial direction. In the axial direction, the width of the band 16 is greater than the width of the belt 14. The band 16 includes a cord and topping rubber, which are not shown. The cord is helically wound. The band 16 has a so-called jointless structure. The cord extends substantially in the circumferential direction. An angle of the cord relative to the circumferential direction is not greater than 5°, and more preferably not greater than 2°. The belt 14 is held by the cord. Therefore, lifting of the belt 14 is inhibited. The cord is formed from an organic fiber.

The inner liner 18 is disposed inward of the carcass 12. The inner liner 18 is joined to the inner surface of the carcass 12. The inner liner 18 is formed from a crosslinked rubber having excellent airtightness. A typical base rubber of the inner liner 18 is an isobutylene-isoprene-rubber or halogenated isobutylene-isoprene-rubber. The inner liner 18 maintains the internal pressure of the tire 2.

Each chafer 20 is disposed near the bead 10. When the tire 2 is mounted on a rim, the chafer 20 contacts with the rim. By the contact, a portion near the bead 10 is protected. In the present embodiment, the chafer 20 is formed from a fabric and a rubber impregnated into the fabric.

Each bead filler 22 is disposed between the bead 10 and the carcass 12. The bead filler 22 is turned up around the core 34 of the bead 10 from the outer side toward the inner side in the axial direction. The bead filler 22 reinforces the bead 10 portion. The bead filler 22 includes multiple cords aligned with each other and topping rubber, which is not shown. Each cord is tilted relative to the radial direction. The cords are formed from an organic fiber.

Each first reinforcing filler 24 extends radially outward from a portion near the core 34 of the bead 10 along the carcass 12. The first reinforcing filler 24 is disposed outward of the second carcass ply 42 in the axial direction. The first reinforcing filler 24 reinforces the bead 10 portion. The first reinforcing filler 24 includes multiple cords aligned with each other and topping rubber, which is not shown. Each cord is tilted relative to the radial direction. The cords are formed from an organic fiber.

Each second reinforcing filler 26 extends radially outward from a portion near the core 34 of the bead 10 along the carcass 12. The second reinforcing filler 26 is disposed between the first reinforcing filler 24 and the clinch 8 in the axial direction. The second reinforcing filler 26 covers the entirety of the first reinforcing filler 24. The second reinforcing filler 26 reinforces the bead 10 portion. The second reinforcing filler 26 includes multiple cords aligned with each other and topping rubber, which is not shown. Each cord is tilted relative to the radial direction. The cords are formed from an organic fiber.

As shown in FIG. 1, a plurality of ribs 48 are provided in the tread 4 of the tire 2. The tread 4 includes the plurality of ribs 48. The ribs 48 are aligned in the axial direction. Each rib 48 extends in the circumferential direction. In the tire 2, the rib 48 is continuous in the circumferential direction. The rib 48 may include multiple blocks disposed at predetermined pitches in the circumferential direction.

In the tire 2, a groove 50 is formed between one of the ribs 48 and another rib 48 disposed adjacent to the one of the ribs 48. The ribs 48 extend in the circumferential direction. Therefore, the groove 50 also extends in the circumferential direction. In the present invention, the groove 50 that divides one of the ribs 48 from another rib 48 is referred to as a main groove. In the tire 2, the main groove 50 is formed between one of the ribs 48 and another rib 48 disposed adjacent to the one of the ribs 48. The main groove 50 is continuous in the circumferential direction.

The width and the depth of the main groove 50 influence drainage and stiffness of the tread 4. In the tire 2, from the viewpoint that drainage and stiffness of the tread 4 are assured, the width of the main groove 50 is preferably set to be not less than 1% of the ground contact width of the tire 2 and not greater than 7% thereof. From the viewpoint that drainage and stiffness of the tread 4 are assured and in consideration of the thickness of the tread 4, the depth of the main groove 50 is set to be not less than 8.0 mm and not greater than 22.0 mm. That is, the depth of the main groove 50 is not less than 8.0 mm and not greater than 22.0 mm.

In the present invention, the ground contact width of the tire 2 is represented as the maximum width, in the axial direction, of the ground contact surface. In order to obtain the ground contact width, the ground contact surface is confirmed as follows. The tire 2 is mounted on a normal rim and the tire 2 is inflated with air to a normal internal pressure. The camber angle is set to 0°, and a normal load is applied to the tire 2, and the tire 2 is brought into contact with a flat surface. Thus, the ground contact surface is obtained. The ground contact width described above is measured on the basis of the ground contact surface.

In the description herein, the normal rim represents a rim that is specified according to the standard with which the tire 2 complies. The "standard rim" in the JATMA standard, the "Design Rim" in the TRA standard, and the "Measuring Rim" in the ETRTO standard are included in the normal rim.

In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard, are included in the normal internal pressure.

In the description herein, the normal load represents a load that is specified according to the standard with which the tire 2 complies. The "maximum load capacity" in the JATMA standard, the "maximum value" recited in "TIRE LOAD LIMITS AT VARIOUS COLD INFLATION PRESSURES" in the TRA standard, and the "LOAD CAPACITY" in the ETRTO standard, are included in the normal load.

In the present invention, unless otherwise specified, the dimensions and angles of the components of the tire 2 are measured in a state where the tire 2 is mounted on a normal rim, and inflated with air to a normal internal pressure. During the measurement, no load is applied to the tire 2.

In the tire 2, the tread 4 has three main grooves 50, in total, which include a not-illustrated main groove 50. By the three main grooves 50, the tread 4 of the tire 2 has four ribs 48 formed therein.

As shown in FIG. 1, in the tire 2, the main groove 50 is disposed at the position of the equator plane. In other words, the rib 48 is not disposed at the position of the equator plane. In the tire 2, ribs 48e, among the four ribs 48, disposed near the equator plane, are each referred to as a crown rib. Ribs 48s disposed on the outer side in the axial direction are each referred to as a shoulder rib. Further, main grooves 50s disposed near the shoulder ribs 48s are each referred to as a shoulder main groove. In a case where the tread 4 has the odd number of ribs 48, the rib 48 is disposed at the position of the equator plane in general. Therefore, in this case, the rib 48 disposed at the equator plane is referred to as the crown rib. In the present invention, the rib 48e disposed at the equator plane of the tire 2 or at a position near the equator plane is a crown rib, and the ribs 48s disposed on the outer side in the axial direction are shoulder ribs. The main grooves 50s disposed near the shoulder ribs 48s are shoulder main grooves. In the tire 2, outer surfaces 52 of the crown ribs 48e and outer surfaces 54 of the shoulder ribs 48s form a part of the tread surface 28.

When the tire 2 is produced, a plurality of rubber members are assembled to obtain a raw cover (unvulcanized tire). The raw cover is put into a mold (not shown). The outer surface of the raw cover contacts with a cavity surface of the mold. The inner surface of the raw cover contacts with a bladder or a rigid core. The raw cover is pressurized and heated in the mold. A rubber composition of the raw cover flows by the pressurizing and heating.

Cross-linking reaction is caused in the rubber by the heating, to obtain the tire 2 shown in FIG. 1. By using a mold having an uneven pattern in the cavity surface, an uneven pattern is formed in the tire 2.

FIG. 2 shows a part of an outline of an outer surface 56 of the tire 2 shown in FIG. 1. In FIG. 2, the up-down direction represents the radial direction of the tire 2, the left-right direction represents the axial direction of the tire 2, and the direction perpendicular to the surface of the drawing sheet represents the circumferential direction of the tire 2. The outline represents the shape of the outer surface 56 on the cross-section of the tire 2 along the plane that includes the center axis of the tire 2.

In the present invention, the outline of the outer surface 56 of the tire 2 is specified on the basis of the cavity surface of the mold. The outline, shown in FIG. 2, of the outer surface 56 of the tire 2 corresponds to the shape of the cavity surface of the mold for the tire 2. In other words, a part of the cavity surface of the mold used for producing the tire 2 is shown in FIG. 2.

In FIG. 2, reference character PW represents the axially outer side end of the tire 2. A double-headed arrow WW represents a distance, in the axial direction, from one of the outer side ends PW to the other of the outer side ends PW (not shown). The distance WW represents the width, in the axial direction, of the tire 2. The outline of the outer surface 56 of the tire 2 has the maximum axial width WW at the outer side ends PW. A double-headed arrow WT represents a distance, in the axial direction, from one of the ends PT of the tread surface 28 to the other of the ends PT (not shown) of the tread surface 28. The distance WT represents the width, in the axial direction, of the tread surface 28.

In the tire 2, a ratio of the width WT of the tread surface 28 to the maximum width WW is not less than 0.7 and not greater than 0.9. Thus, in the tire 2, a contact area can be assured and deformation can be made appropriate in a well-balanced manner.

In the tire 2, the outline of the outer surface 52 of the crown rib 48e is represented as an arc (hereinafter, referred to as a first arc). In FIG. 2, an arrow R1 represents the radius of the first arc. In the tire 2, the radius R1 of the first arc is set to be not less than 300 mm and not greater than 1000 mm. The range of the radius R1 is equivalent to the range of the radius of an arc, which is set when, in a conventional tire, the outline of the outer surface of the crown rib is represented as the arc. The center of the circle to which the first arc belongs is disposed on the equator plane, which is not shown in FIG. 2 since the radius R1 is large.

In FIG. 2, reference character R1S represents one end (hereinafter, referred to as a first end) of the first arc. Reference character R1E represents the other end (hereinafter, referred to as a second end) of the first arc. A double-headed arrow L1 represents a distance from the first end R1S to the second end R1E. The distance L1 represents the length of the chord of the first arc.

In the tire 2, in consideration of the size of the tire, stiffness of the crown rib 48e, influence of the crown rib 48e on performance of the tire 2, and the like, a length L1 of the chord of the first arc is set. Specifically, a ratio of the length L1 of the chord of the first arc to the width WT of the tread surface 28 is preferably not less than 0.1 and preferably not greater than 0.3. The ratio is more preferably not less than 0.15 and more preferably not greater than 0.25.

In the tire 2, the outline of the outer surface 54 of the shoulder rib 48s is represented as an arc (hereinafter, referred to as a second arc). In FIG. 2, an arrow R2 represents the radius of the second arc. Reference character R2S represents one end (hereinafter, referred to as a first end) of the second arc. Reference character R2E represents the other end (hereinafter, referred to as a second end) of the second arc. In the tire 2, the second end R2E is also the end PT of the tread surface 28. A double-headed arrow L2 represents a distance from the first end R2S to the second end R2E. The distance L2 represents the length of the chord of the second arc. Reference character CA represents the middle point of the second arc, and reference character CS represents the center of the chord of the second arc. A double-headed arrow V represents a distance from the center CS of the chord of the second arc to the middle point CA of the second arc. The distance V represents the distance from the center CS of the chord of the second arc to the second arc, that is, represents an amount of projection.

In the tire 2, in consideration of the size of the tire, the stiffness of the shoulder rib 48s, influence of the shoulder rib 48s on performance of the tire 2, and the like, a length L2 of the chord of the second arc is set. Specifically, a ratio of the length L2 of the chord of the second arc to the width WT of the tread surface 28 is preferably not less than 0.1 and preferably not greater than 0.3. The ratio is more preferably not less than 0.15 and more preferably not greater than 0.25.

In the tire 2, a ratio of the distance V from the center CS of the chord of the second arc to the second arc relative to the length L2 of the chord of the second arc is not less than 0.03 and not greater than 0.05. When the ratio is set to be not less than 0.03, the outer surface 54 of the shoulder rib 48s is prevented from being excessively flattened. In the tire 2, the outer surface 54 of the shoulder rib 48s is prevented from being warped during cornering, and contact pressure at the first end R2S and the second end R2E of the shoulder rib 48s is appropriately maintained. In the tire 2, wear at the first end R2S and the second end R2E is effectively inhibited. Contact pressure at the center CA of the shoulder rib 48s is prevented from being reduced, thereby sufficiently obtaining cornering power. In the tire 2, in cornering, steering stability is good. When the ratio is set to be not greater than 0.05, a difference between the circumferential length at the first end R2S and the circumferential length at the second end R2E is appropriately maintained in the shoulder rib 48s. The extent to which the shoulder rib 48s slips due to a difference in circumferential length is reduced so as to be small. Therefore, the shoulder rib 48s is less likely to be worn due to the difference in circumferential length. Further, in cornering, the contact area in the shoulder rib 48s can be sufficiently assured. Therefore, in the tire 2, good steering stability is maintained.

As described above, in the tire 2, the shape of the outer surface 54 of the shoulder rib 48s is appropriately adjusted by the length L2 of the chord of the second arc that represents the shape of the outer surface 54, and the distance V from the center CS of the chord of the second arc to the second arc. In the shoulder rib 48s, not only progress of wear due to the difference in circumferential length but also warping of the outer surface during cornering as observed in a conventional tire is inhibited. In the tire 2, steering stability is advantageously obtained in cornering without reducing wear resistance. According to the present invention, the pneumatic tire 2 that allows steering stability to be improved without reducing wear resistance can be obtained.

In FIG. 2, a double-headed arrow e represents the depth of the shoulder main groove 50s. A solid line E1 represents an extension line of the first arc. The extension line E1 represents an arc that extends axially outward from the second end R1E of the first arc. The depth e of the shoulder main groove 50s is represented as a distance from the bottom of the shoulder main groove 50s to the extension line E1.

In the tire 2, a ratio of the above-described distance V to the depth e of the shoulder main groove 50s is preferably not less than 0.09 and preferably not greater than 0.15. When the ratio is set to be not less than 0.09, the outer surface 54 of the shoulder rib 48s is effectively prevented from being excessively flattened. In the tire 2, the outer surface 54 of the shoulder rib 48s is prevented from being warped during cornering, and contact pressure at the first end R2S and the second end R2E of the shoulder rib 48s is appropriately maintained. In the tire 2, wear at the first end R2S and the second end R2E is effectively inhibited. Contact pressure at the center CA of the shoulder rib 48s is prevented from being reduced, thereby sufficiently obtaining cornering power. In the tire 2, in cornering, steering stability is good. When the ratio is set to be not greater than 0.15, a difference between the circumferential length at the first end R2S and the circumferential length at the second end R2E is appropriately maintained in the shoulder rib 48s. The extent to which the shoulder rib 48s slips due to the difference in circumferential length is reduced so as to be smaller. Therefore, the shoulder rib 48s is less likely to be worn due to the difference in circumferential length. Further, in cornering, the contact area in the shoulder rib 48s is sufficiently assured. Therefore, in the tire 2, good steering stability is maintained.

In the tire 2, a ratio of the radius R2 of the second arc that represents the outline of the outer surface 54 of the shoulder rib 48s relative to the radius R1 of the first arc that represents the outline of the outer surface 52 of the crown rib 48e is preferably not less than 0.15 and preferably not greater than 0.35. When the ratio is set to be not less than 0.15, a difference between the circumferential length at the first end R2S and the circumferential length at the second end R2E is appropriately maintained in the shoulder rib 48s. The extent to which the shoulder rib 48s slips due to the difference in circumferential length is reduced so as to be small. Therefore, the shoulder rib 48s is less likely to be worn due to the difference in circumferential length. Further, in cornering, the contact area in the shoulder rib 48s is sufficiently assured. Therefore, in the tire 2, good steering stability is maintained. In this viewpoint, the ratio is more preferably not less than 0.20. When the ratio is set to be not greater than 0.35, the outer surface 54 of the shoulder rib 48s is prevented from being excessively flattened. In the tire 2, the outer surface 54 of the shoulder rib 48s is prevented from being warped during cornering, and contact pressure at the first end R2S and the second end R2E of the shoulder rib 48s is appropriately maintained. In the tire 2, wear at the first end R2S and the second end R2E is effectively inhibited. Contact pressure at the center CA of the shoulder rib 48s is prevented from being reduced, thereby sufficiently obtaining cornering power. In the tire 2, in cornering, steering stability is good. In this viewpoint, the ratio is more preferably not greater than 0.30.

In FIG. 2, a solid line E2 represents an extension line of the second arc. The extension line E2 is an arc that extends axially inward from the first end R2S of the second arc. Reference character R2A represents a point of intersection of the extension line E2 and a line that represents the outline of the side wall of the shoulder main groove 50s.

As shown in FIG. 2, in the tire 2, the point R2A of intersection is disposed radially inward of the first end R2S of the second arc. In the tire 2, in particular, increase of contact pressure at the first end R2S of the shoulder rib 48s is effectively inhibited. Also by the shape of the outer surface 54 of the shoulder rib 48s being appropriately adjusted by the length L2 of the chord of the second arc that represents the shape of the outer surface 54, and the distance V from the center CS of the chord of the second arc to the second arc, wear at the first end R2S is effectively inhibited in the tire 2. Further, the outer surface 54 of the shoulder rib 48s is prevented from being warped, whereby contact pressure at the center CA of the shoulder rib 48s is prevented from being reduced. An area of a portion in which the contact pressure is high is sufficiently assured, thereby sufficiently obtaining cornering power. The tire 2 exhibits excellent responsiveness, whereby a driver need not set a steering angle so as to be great by sharply turning a steering wheel in cornering. The vehicle can sufficiently perform cornering by a small steering angle, whereby a region of a portion, of the tire 2, which slips relative to a road surface is minimized. Therefore, the tire 2 is further inhibited from being worn. In the tire 2, steering stability is made good in cornering without reducing wear resistance. In this viewpoint, in the tire 2, the point R2A of intersection of: the extension line E2, of the second arc, which extends axially inward from the first end R2S of the second arc; and the side wall of the shoulder main groove 50s, is preferably disposed inward of the first end R2S in the radial direction.

EXAMPLES

Example 1

A tire (tire size=205/85R16) shown in FIG. 1 was produced. When the tire was produced, a mold having the cavity surface shaped as shown in FIG. 2 was used. As a condition for a vulcanizer or the like for producing the tire, a condition for a conventional tire was used.

As indicated below in Table 1, in example 1, the length L2 of the chord of the second arc representing the outline of the outer surface of the shoulder rib was 33.8 mm. The depth e of the shoulder main groove was 11.2 mm. The distance V from the center CS of the chord of the second arc to the second arc, that is, the amount V of projection was 1.35 mm. Therefore, a ratio (V/L2) of the amount V of projection to the distance L2 was 0.040. A ratio (V/e) of the amount V of projection to the depth e of the shoulder main groove was 0.12.

Comparative Example 1

A tire of comparative example 1 was obtained in the same manner as in example 1 except that the distance V was 0 mm, that is, the outer surface of the shoulder rib was flat, and the ratio (V/L2) and the ratio (V/e) were as indicated below in Table 1.

Examples 2 to 5 and Comparative Example 2

Tire of examples 2 to 5 and comparative example 2 were each obtained in the same manner as in example 1 except that the radius R2 of the second arc was different, and the amount V of projection, the ratio (V/L2), and the ratio (V/e) were as indicated below in Tables 1 and 2.

[Wear Resistance]

The tires were each mounted on a rim (16×8.5 J), and inflated with air to an internal pressure of 600 kPa. The tires were mounted to a 3-ton truck. The cargo bed was loaded with cargo such that a load of 12.6 kN was applied to one tire. Thus, a state where the truck was loaded with its maximum load of the cargo was produced. A driver was caused to drive the truck in a circuit at a speed of 80 km/h. After 100000 km running, an amount of wear of the tire was measured. The result is indicated below as indexes in Tables 1 and 2. The greater the value of the index is, the less the progress of the wear is, that is, the better the result is.

[Steering Stability]

The tires were each mounted on a rim (16×8.5 J), and inflated with air to an internal pressure of 600 kPa. The tires were mounted to a 3-ton truck. The cargo bed was loaded with a cargo such that a load of 12.6 kN was applied to one tire. Thus, a state where the truck was loaded with its maximum load of the cargo was produced. A driver was caused to drive the truck in a circuit, and to evaluate steering stability. The result is indicated below as indexes in Tables 1 and 2. The greater the value of the index is, the more excellent steering stability is, that is, the better the result is.

TABLE 1

| | Evaluation result | | | |
|---|---|---|---|---|
| | Compa. example 1 | Example 2 | Example 3 | Example 1 |
| L2 [mm] | 33.8 | 33.8 | 33.8 | 33.8 |
| e [mm] | 11.2 | 11.2 | 11.2 | 11.2 |
| V [mm] | 0.00 | 1.00 | 1.20 | 1.35 |
| V/L2 [-] | 0 | 0.030 | 0.036 | 0.040 |
| V/e [-] | 0 | 0.09 | 0.11 | 0.12 |
| Wear resistance | 100 | 95 | 100 | 105 |
| Steering stability | 100 | 105 | 110 | 110 |

TABLE 2

| | Example 4 | Example 5 | Compa. example 2 |
|---|---|---|---|
| L2 [mm] | 33.8 | 33.8 | 33.8 |
| e [mm] | 11.2 | 11.2 | 11.2 |
| V [mm] | 1.50 | 1.70 | 2.00 |
| V/L2 [-] | 0.044 | 0.050 | 0.059 |
| V/e [-] | 0.13 | 0.15 | 0.18 |
| Wear resistance | 105 | 100 | 90 |
| Steering stability | 110 | 105 | 90 |

As indicated in Tables 1 and 2, the evaluation is higher in the tires of examples than in the tires of comparative examples. The evaluation result clearly indicates that the present invention is superior.

The technique for ribs described above is applicable to various tires. The foregoing description is in all aspects illustrative, and various modifications can be devised without departing from the essential features of the invention.

What is claimed is:

1. A pneumatic tire comprising
a tread having an outer surface that is a tread surface that comes into contact with a road surface,
wherein
the tread includes a plurality of ribs that extend in a circumferential direction, and are aligned in an axial direction,
a main groove is formed between one of the ribs and another rib disposed adjacent to the one of the ribs,
a rib, among the ribs, disposed near the equator plane, is a crown rib, and a rib, among the ribs, disposed on an outer side in the axial direction is a shoulder rib with a shoulder main groove disposed therebetween,
the crown rib is not disposed at the tire equator plane,
an outer surface of the crown rib and an outer surface of the shoulder rib form a part of the tread surface, and
on a cross-section of the tire along a plane that includes a rotation axis of the tire,
an outline of the outer surface of the crown rib is represented as a first arc, and a center of a circle to which the first arc belongs is disposed on the equator plane,
an outline of the outer surface of the shoulder rib is represented as a second arc
a ratio of a distance from a center of a chord of the second arc to the second arc relative to a length of the chord of the second arc is not less than 0.036 and not greater than 0.050.

2. The pneumatic tire according to claim 1, wherein
the main groove near the shoulder rib is a shoulder main groove, and
a ratio of the distance from the center of the chord of the second arc to the second arc relative to a depth of the shoulder main groove is not less than 0.09 and not greater than 0.15.

3. The pneumatic tire according to claim 1, wherein the second arc has a first end on an axially inner end of the shoulder rib and a second end on the axially outer end of the shoulder rib, and a point, which represents a point of intersection of an extension of the second arc axially inward and an axially inner sidewall of the shoulder main groove, is disposed radially inward of the second arc first end.

4. The pneumatic tire according to claim 1, wherein a ratio of the length of the chord of the second arc to the width of the tread surface is not less than 0.1 and not greater than 0.3.

* * * * *